US012073984B2

(12) United States Patent
Yang et al.

(10) Patent No.: US 12,073,984 B2
(45) Date of Patent: Aug. 27, 2024

(54) LAMINATED SHIELDING INDUCTOR

(71) Applicant: Shenzhen Sunlord Electronics Co., Ltd., Guangdong (CN)

(72) Inventors: Yihua Yang, Guangdong (CN); Xianren Chen, Guangdong (CN); Zhongdong Wu, Guangdong (CN)

(73) Assignee: Shenzhen Sunlord Electronics Co., Ltd., Guangdong (CN)

( * ) Notice: Subject to any disclaimer, the term of this patent is extended or adjusted under 35 U.S.C. 154(b) by 535 days.

(21) Appl. No.: 17/472,720

(22) Filed: Sep. 13, 2021

(65) Prior Publication Data

US 2022/0115178 A1 Apr. 14, 2022

Related U.S. Application Data

(63) Continuation of application No. PCT/CN2020/120448, filed on Oct. 12, 2020.

(51) Int. Cl.
*H01F 27/28* (2006.01)
*H01F 17/00* (2006.01)
(Continued)

(52) U.S. Cl.
CPC ..... *H01F 27/2885* (2013.01); *H01F 17/0013* (2013.01); *H01F 27/2804* (2013.01);
(Continued)

(58) Field of Classification Search
CPC ............. H01F 27/2885; H01F 17/0013; H01F 27/2804; H01F 27/292; H01F 27/324; H01F 2017/008; H01F 2027/2809
See application file for complete search history.

(56) References Cited

U.S. PATENT DOCUMENTS

2016/0012950 A1* 1/2016 Nishino ............. H02K 41/0356 216/13
2018/0351529 A1* 12/2018 Miyahara ................ H01F 27/29
(Continued)

FOREIGN PATENT DOCUMENTS

CN 102301437 12/2011
CN 105556623 5/2016
(Continued)

*Primary Examiner* — Malcolm Barnes
(74) *Attorney, Agent, or Firm* — Winston Hsu

(57) ABSTRACT

A laminated shielding inductor includes a laminated body, an internal coil, and a shielding cover; the laminated body includes a plurality of insulator layers; shielding conductor through grooves which are located at the periphery of the internal coil are formed in the plurality of insulator layers; shielding conductors are arranged in the shielding conductor through grooves, are electrically and mutually connected and jointly form a shielding conductor laminated layer; a shielding conductor upper layer and a shielding conductor lower layer are respectively arranged above and below the internal coil; and the shielding conductor laminated layer, the shielding conductor upper layer and the shielding conductor lower layer are closed to form the shielding cover. Thus, high shielding effect of the laminated chip inductor can be realized, external radiation of the laminated chip inductor is effectively reduced, and the reliability of a circuit system is improved.

10 Claims, 3 Drawing Sheets

(51) Int. Cl.
*H01F 27/29* (2006.01)
*H01F 27/32* (2006.01)

(52) U.S. Cl.
CPC ......... *H01F 27/292* (2013.01); *H01F 27/324* (2013.01); *H01F 2017/008* (2013.01); *H01F 2027/2809* (2013.01)

(56) References Cited

U.S. PATENT DOCUMENTS

| | | | | |
|---|---|---|---|---|
| 2019/0318868 | A1* | 10/2019 | Chung | H01F 27/32 |
| 2019/0379343 | A1* | 12/2019 | Miyahara | H01G 4/224 |
| 2020/0027647 | A1* | 1/2020 | Yang | H01F 17/0013 |
| 2020/0143979 | A1* | 5/2020 | Ohkubo | H01F 27/2885 |

FOREIGN PATENT DOCUMENTS

| | | | | | |
|---|---|---|---|---|---|
| CN | 205211518 | | | 5/2016 | |
| CN | 111491442 | | | 8/2020 | |
| CN | 111491442 | B | * | 12/2023 | H05K 1/0219 |
| JP | 2012138535 | A | * | 7/2012 | H01F 17/00 |
| JP | 2012138535 | A | | 7/2012 | |

* cited by examiner

LAMINATED SHIELDING INDUCTOR

CROSS REFERENCE TO RELATED APPLICATIONS

This application is a continuation application of PCT/CN2020/120448 filed on 2020 Oct. 12. The contents of the above-mentioned application are all hereby incorporated by reference.

BACKGROUND OF THE INVENTION

1. Field of the Invention

The present invention generally relates to a laminated shielding inductor. In particular, the present invention is directed to a laminated shielding inductor to effectively prevent or reduce the external radiation of the laminated chip inductor.

2. Description of the Prior Art

With the development of communication technologies such as WiFi6 and 5G, the application frequency becomes increasingly higher, and the channels are getting narrower and narrower. An inductive device serves as a radiation source, therefore, EMI is considered in the application process of the inductive device, the external radiation of the inductive device easily disturbs a circuit system, especially a sensitive circuit therein, and affects the reliability of the circuit system working.

The disclosure of the content of the above background art is only used to assist in the understanding of the inventive concept and technical solution of the present invention, and does not necessarily belong to the prior art of the present patent application. In the absence of clear evidence that the above content has been disclosed on the filing date of the present patent application, the above background art should not be used to evaluate the novelty and inventiveness of the present application.

SUMMARY OF THE INVENTION

The main purpose of the present invention is to overcome the defects of the above background art and provide a laminated shielding inductor so as to effectively prevent or reduce the external radiation of the laminated chip inductor, thereby improving the reliability of a circuit system.

In order to realize the above purpose, the present invention adopts the following technical solution:

the laminated shielding inductor comprises a laminated body, an internal coil, a first external electrode, a second external electrode, a third external electrode, and a shielding cover, wherein the laminated body comprises a plurality of insulator layers arranged in a laminating manner and is provided with a plurality of layers of coil conductors arranged among the plurality of insulator layers in a laminating manner, conductive through holes are formed in the plurality of insulator layers, the coil conductors of different layers are electrically connected through the conductive through holes to form the internal coil, shielding conductor through grooves which are located at the periphery of the internal coil are formed in the plurality of insulator layers, shielding conductors are arranged in the shielding conductor through grooves, the shielding conductors in the plurality of shielding conductor through grooves are electrically connected and jointly form a shielding conductor laminated layer surrounding an outer side of the internal coil, a shielding conductor upper layer and a shielding conductor lower layer are respectively arranged above and below the internal coil, the shielding conductor laminated layer, the shielding conductor upper layer and the shielding conductor lower layer are closed to form the shielding cover enclosing the internal coil, the first external electrode, the second external electrode, and the third external electrode are arranged on a surface of the laminated body, the first external electrode and the second external electrode are electrically connected to the two ends of the internal coil respectively, and the third external electrode is electrically connected to the shielding cover.

Further, the shielding conductor upper layer and the shielding conductor lower layer are located inside the laminated body, insulator layers are respectively arranged at outer sides of the shielding conductor upper layer and the shielding conductor lower layer, the conductive through holes are formed in the plurality of insulator layers so as to electrically connect the shielding conductor upper layer or the shielding conductor lower layer and the third external electrode.

Further, at least apart of each of the first external electrode, the second external electrode, and the third external electrode is located on a same surface of the laminated body, first to third conductive through holes are formed in the insulator layers, fourth to fifth conductive through holes are formed in the shielding cover, the first conductive through hole is electrically connected to the fourth conductive through hole, the second conductive through hole is electrically connected to the fifth conductive through hole, the first external electrode is electrically connected to one end of the internal coil through the first conductive through hole and the fourth conductive through hole, the second external electrode is electrically connected to the other end of the internal coil through the second conductive through hole and the fifth conductive through hole, and the third external electrode is electrically connected to the shielding cover through the third conductive through holes.

Further, at least apart of each of the first external electrode, the second external electrode, and the third external electrode is located on a same surface of the laminated body, and the same surface is a surface perpendicular to a laminated direction of the laminated body, that is, an axial direction of the internal coil.

Further, the laminated body is of a cuboid-shaped structure and has two opposite end faces, two opposite side faces, and opposite upper and lower surfaces, and the same surface is the lower surface of the laminated body.

Further, the shielding conductor laminated layer is of a cuboid-shaped barrel-type structure.

Further, the lower surface of the laminated body is a mounting surface of the laminated shielding inductor.

Further, the conductive through holes connected to the first external electrode and the second external electrode are formed to be perpendicular to the mounting surface where the first external electrode and the second external electrode are located and to be parallel to a first connecting conductor and a second connecting conductor of the axial direction of the internal coil.

Further, the insulation distance between the internal coil and the shielding cover is greater than 30 μm; the insulation distance between the first connecting conductor and the shielding cover and the insulation distance between the second connecting conductor and the shielding cover are greater than 30 μm; and the distance between the shielding cover and the outside of the laminated shielding inductor is greater than 15 μm.

Further, the first connecting conductor and the second connecting conductor respectively pass through the through holes in the shielding conductor lower layer or the shielding conductor upper layer, and are electrically connected to the first external electrode and the second external electrode, the first connecting conductor and the second connecting conductor are insulated from the shielding conductor lower layer or the shielding conductor upper layer by ceramic materials.

The present invention has the following technical effects: The laminated body of the laminated shielding inductor disclosed by the present invention comprises a plurality of insulator layers which are arranged in a laminating manner; shielding conductor through grooves which are located at the periphery of the inside coil are formed in the plurality of insulator layers; shielding conductors are arranged in the shielding conductor through grooves, are mutually and electrically connected and jointly form a shielding conductor laminated layer surrounding the outer side of the inside coil; the shielding conductor upper layer and the shielding conductor lower layer are respectively arranged above and below the internal coil; the shielding conductor laminated layer, the shielding conductor upper layer and the shielding conductor lower layer are closed to form the shielding cover enclosing the internal coil; the shielding cover is connected to the third external electrode which is arranged on the surface of the laminated body; thus, the positively charged coil conductor of the laminated shielding inductor is surrounded by the internally complete conductive shielding cover (such as a metal shielding cover), the negative charge, the amount of which is the same as the amount of the charged coil conductor, will be induced at the inner side of the shielding cover, the positive charge, the amount of which is the same as the amount of the charged coil conductor, appears on the outer side of the shielding cover, when the shielding cover is grounded through the third external electrode, the positive charge on the outer side will flow into the ground, and there will be no electric field on the outer side, that is, the electric field of the positively charged coil conductor is shielded in the shielding cover. When the shielding inductor works in the circuit, the shielding layer is ensured to be well grounded, so that the coupling interference voltage of the alternating electric field to a sensitive circuit can be reduced.

High shielding effect of the laminated chip inductor can be realized, and the laminated coil element with high Q value is realized. The external radiation of the laminated chip inductor can be effectively reduced, and the reliability of a circuit system is improved.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
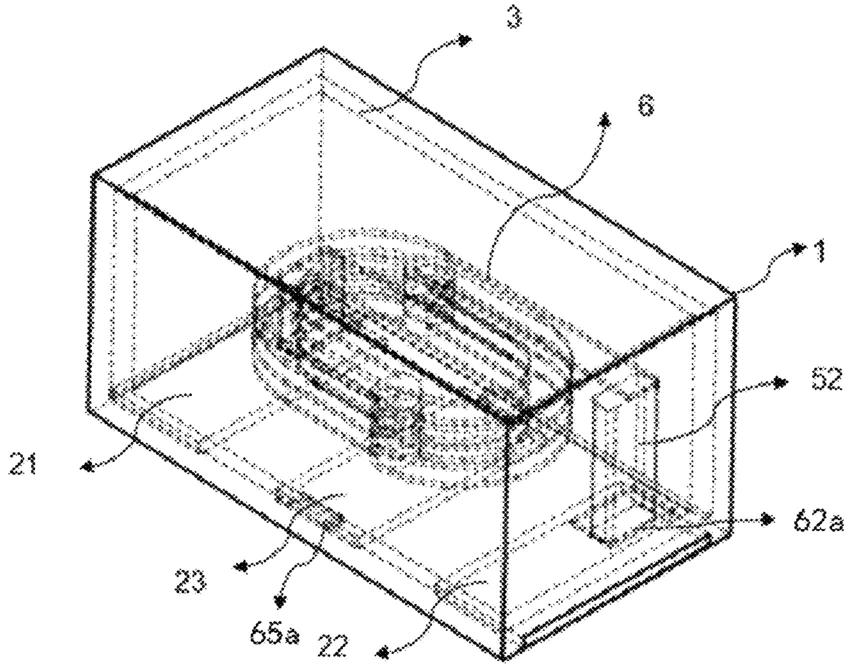
FIG. 1A is a perspective view of a laminated shielding inductor according to an embodiment of the present invention.

Embodiments of the present invention are described in detail below. It should be emphasized that the following description is only exemplary, and is not intended to limit the scope and application of the present invention.

It should be noted that when a component is referred to as being “fixed to” or “arranged on” another component, the component can be directly on the other component or indirectly on the other component. When a component is referred to as being “connected to” another component, the component can be directly connected to the other component or indirectly connected to the other component. In addition, the connection can be used for fixing or for coupling or communication.

It should be understood that the orientation or positional relationship indicated by terms such as “length”, “width”, “upper”, “lower”, “front”, “rear”, “left”, “right”, “vertical”, “horizontal”, “top”, “bottom”, “inner”, and “outer” is based on the orientation or positional relationship shown in the drawings, and is only for the convenience of describing the embodiments of the present invention and simplifying the description, rather than indicating or implying that the pointed device or component must have a specific orientation, be constructed and operated in a specific orientation, and therefore, the orientation or positional relationship cannot be understood as a limitation of the present invention.

In addition, the terms “first” and “second” are only used for describing purposes, and cannot be understood as indicating or implying relative importance or implicitly indicating the number of indicated technical features. Therefore, the features defined with “first” and “second” may explicitly or implicitly include one or more of these features. In the description of the embodiments of the present invention, “a plurality of” means two or more than two, unless otherwise specifically defined.

Figure 1B:
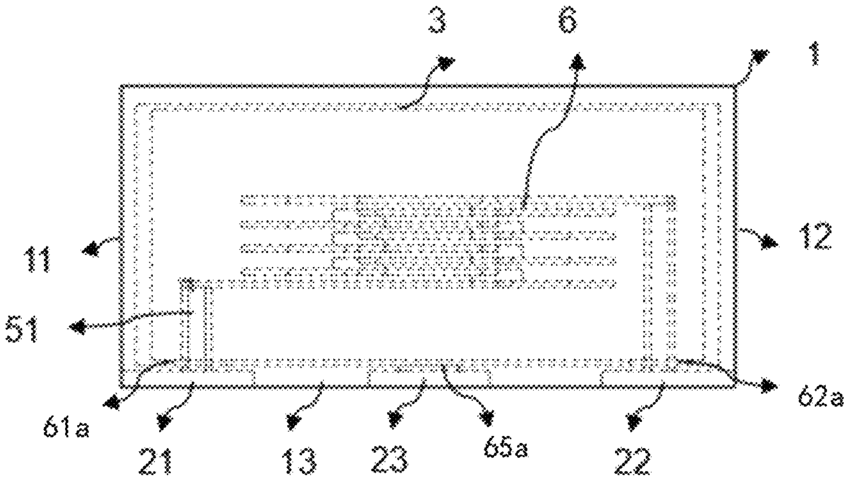
FIG. 1B is a side perspective view of the laminated shielding inductor shown in FIG. 1A.
Figure 1C:
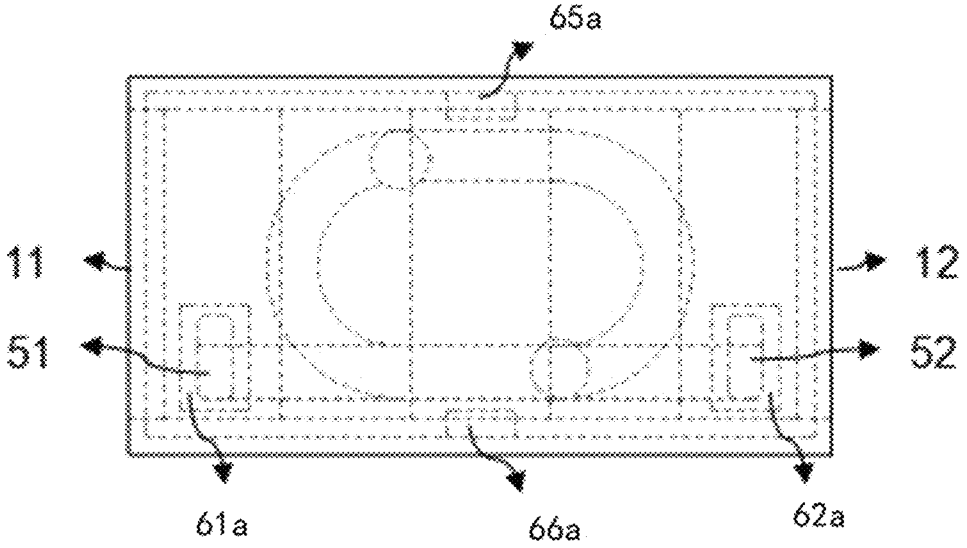
FIG. 1C is a bottom perspective view of the laminated shielding inductor shown in FIG. 1A.
Figure 2:
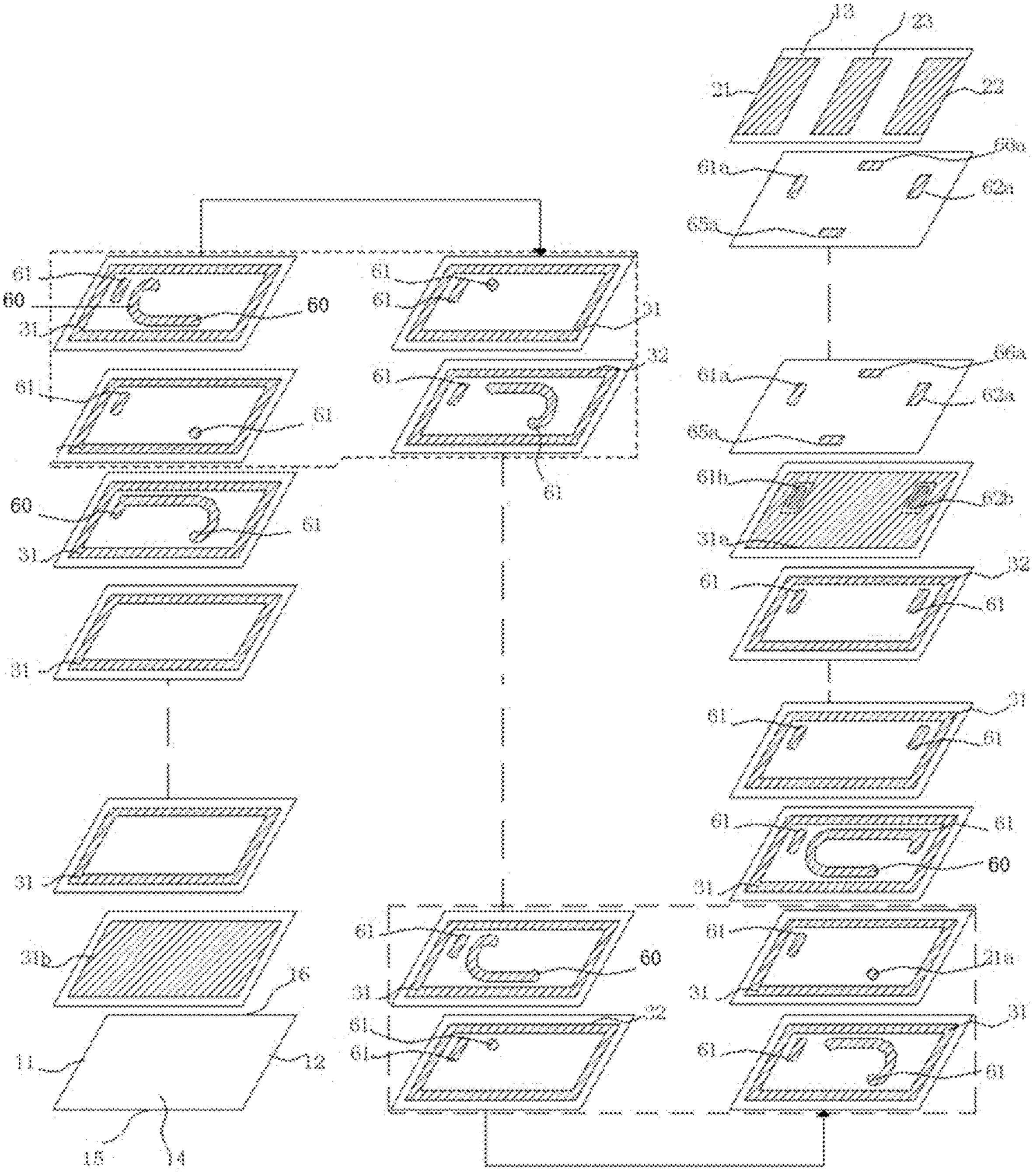
FIG. 2 is an exploded view of an example of a laminated body of the laminated shielding inductor shown in FIG. 1A.

Referring to FIG. 1A to FIG. 2, the embodiment of the present invention provides a laminated shielding inductor which comprises a laminated body 1, an internal coil 60, a first external electrode 21, a second external electrode 22, a third external electrode 23, and a shielding cover 3; the laminated body 1 comprises a plurality of insulator layers which are arranged in a laminating manner; the laminated body 1 is provided with a plurality of layers of coil conductors 60 which are arranged among the plurality of insulator layers in a laminating manner; conductive through holes 61 are formed in the plurality of insulator layers; the coil conductors 60 of different layers are electrically connected through the conductive through holes 61 to form the internal coil; shielding conductor through grooves 32 which are located at the periphery of the internal coil 6 are formed in the plurality of insulator layers; shielding conductors 31 are arranged in the shielding conductor through grooves 32; the shielding conductors 31 in the shielding conductor through grooves 32 are electrically connected and jointly form a shielding conductor laminated layer surrounding an outer side of the internal coil 6; a shielding conductor upper layer 31*b* and a shielding conductor lower layer 31*a* are respectively arranged above and below the internal coil 6; the shielding conductor laminated layer, the shielding conductor upper layer 31*b* and the shielding conductor lower layer 31*a* are closed to form the shielding cover 3 enclosing the internal coil 6; the first external electrode 21, the second external electrode 22, and the third external electrode 23 are arranged on a surface of the laminated body 1; the first external electrode 21 and the second external electrode 22 are respectively and electrically connected to the two ends of the internal coil 6; and the third external electrode 23 is electrically connected to the shielding cover 3.

In a preferred embodiment, the shielding conductor upper layer 31*b* and the shielding conductor lower layer 31*a* are located inside the laminated body 1, and the insulator layers are respectively arranged at outer sides of the shielding conductor upper layer 31*b* and the shielding conductor lower layer 31*a*. The conductive through holes 65*a* and 66*a* are formed in the insulator layers so as to electrically connect the shielding conductor upper layer 31*b* or the shielding conductor lower layer 31*a* to the third external electrode 23.

In a preferred embodiment, at least a part of each of the first external electrode 21, the second external electrode 22, and the third external electrode 23 is located on the same surface of the laminated body 1 (for example, on the first main surface 13); a first conductive through hole 61*a*, a second conductive through hole 62*a* and a or more third conductive through holes 65*a* and 66*a* are formed in the insulator layers; a fourth conductive through hole 61*b* and a fifth conductive through hole 62*b* are formed in the shielding cover 31; the first conductive through hole 61*a* is electrically connected to the fourth conductive through hole 61*b*; the second conductive through hole 62*a* is electrically connected to the fifth conductive through hole 65*b*; the first external electrode 21 is electrically connected to one end of the internal coil 6 through the first conductive through hole 61*a* and the fourth conductive through hole 61*b*; the second external electrode 22 is electrically connected to the other end of the internal coil 6 through the second conductive through hole 62*a* and the fifth conductive through hole 62*b*; and the third external electrode 23 is electrically connected to the shielding cover 3 through the third conductive through holes 65*a* and 66*a*.

In a preferred embodiment, at least a part of each of the first external electrode 21, the second external electrode 22, and the third external electrode 23 is located on a same surface of the laminated body 1, and the same surface is a surface perpendicular to a laminated direction of the laminated body 1, that is, an axial direction of the internal coil 6.

In a preferred embodiment, the laminated body 1 is of a cuboid-shaped structure and has two opposite end faces, two opposite side faces, and opposite upper and lower surfaces, and the same surface is the lower surface of the laminated body 1.

In a preferred embodiment, the shielding conductor laminated layer is of a cuboid-shaped barrel-type structure.

In a preferred embodiment, the lower surface of the laminated body 1 is a mounting surface of the laminated shielding inductor.

In a preferred embodiment, the conductive through holes connected to the first external electrode 21 and the second external electrode 22 are formed to be perpendicular to the mounting surface where the first external electrode 21 and the second external electrode 22 are located and to be parallel to a first connecting conductor 51 and a second connecting conductor 52 of the axial direction of the inside coil 6.

In a preferred embodiment, the insulation distance between the internal coil 6 and the shielding cover 3 is greater than 30 μm; the insulation distance between the first connecting conductor 51 and the shielding cover 3 and the insulation distance between the second connecting conductor 52 and the shielding cover 3 are greater than 30 μm; and the distance between the shielding cover 3 and the outside of the laminated shielding inductor is greater than 15 μm.

In a preferred embodiment, the first connecting conductor 51 and the second connecting conductor 52 respectively pass through the through holes in the shielding conductor lower layer or the shielding conductor upper layer, and are electrically connected to the first external electrode 21 and the second external electrode 22; and the first connecting conductor 51 and the second connecting conductor 52 are insulated from the shielding conductor lower layer or the shielding conductor upper layer by ceramic materials.

A specific embodiment of the present invention is further described below in conjunction with the drawings.

As shown in FIG. 1A to FIG. 2, the laminated shielding inductor is provided with the laminated body 1, the first external electrode 21, the second external electrode 22, and the third external electrode 23. The laminated body 1 has a cuboid-shaped shape with six surfaces. The laminated body 1 is formed by laminating the plurality of insulator layers, shielding layers formed by the shielding conductors 31, and the internal coil 6; the first external electrode 21 and the second external electrode 22 are respectively connected to the terminals of the internal coil 6; and the third external electrode 23 is connected to the shielding cover 3.

For the cuboid-shaped-shaped laminated shielding inductor of the embodiment, the width direction, the length direction, and the height direction are respectively defined as the X direction, the Y direction, and the Z direction; and the X direction, the Y direction and the Z direction are pairwise orthogonal to each other.

As shown in FIG. 1A to FIG. 2, the laminated shielding inductor has: a first end surface 11 and a second end surface 12 which are opposite in the length direction (Y direction), a first main surface 13 and a second main surface 14 which are orthogonal in the length direction and are located in the height direction (Z direction), and a first side surface 15 and a second side surface 16 which are orthogonal in the length and height directions and are opposite in the width direction (X direction).

As shown in FIG. 1A to FIG. 2, the laminated shielding inductor has the first external electrode 21, the second external electrode 22, and the third external electrode 23 which are located on the first main surface 13, wherein the first external electrode 21 partially covers the first end surface 11, and the second external electrode 22 partially cover the second end surface 12.

When the size of the laminated shielding inductor is 1.0*0.5*0.5 mm, the spacing distance between the first external electrode 21, the second external electrode 22 and the third external electrode 23 which are located on the first main surface 13 is not less than 0.15 mm; the first external electrode 21, the second external electrode 22 and the third external electrode 23 do not extend to the first side surface 15 and the second side surface 16 in the X direction; and the spacing between each of the first external electrode 21, the second external electrode 22 and the third external electrode 23 and the first side surface 15 is not less than 0.03 mm, and the spacing between each of the first external electrode 21, the second external electrode 22 and the third external electrode 23 and the second side surface 16 is not less than 0.03 mm.

FIG. 2 shows the three-dimensional structure details of one specific embodiment.

An Embodiment of a Producing Method

The laminated shielding conductor with the inductance value of 6.0 nH is made by the following steps:

preparing ceramic raw materials with prescribed composition;

adding 50%-55% of binder, 20%-30% of organic solvent, and 5%-15% of photoinitiator to the above pre-fired powder, and putting them into a rolling mill together to obtain printed ceramic slurry;

preparing conductive slurry containing Ag powder and an organic carrier for the internal conductor, with a silver content of 60% to 80%;

coating a carrier plate with the above printed ceramic slurry by using a scraper to make a substrate, printing conductive slurry on the substrate, making a conductive coil and a shielding layer by exposure and developing, printing a layer of printed ceramic slurry on the conductive coil, making through holes by exposure and developing, as shown in FIG. 2, after repeatedly making to a specified number of layers, cutting by using a cutter and making the conductive coil singulated, thereby obtaining a laminated shielding inductor body; placing the laminated body in a sintering furnace, carrying out binder removal treatment at a temperature of 465 DEG C. in an air environment, and sintering at a temperature of 900 DEG C., thereby obtaining the laminated shielding inductor with electrical characteristics; and using a micrometer to measure 50 dimensions of the obtained laminated shielding inductor and calculating the average value, wherein L=1.0 mm, W=0.50 mm, T=0.50 mm;

and sequentially forming a Ni plating layer and a Sn plating layer on a base electrode through electroplating to obtain the final external electrode.

Test

The laminated shielding inductor of the embodiment of the present invention and a common inductor of the same size and the same inductance value are tested and compared. The radiation voltage results of the two products measured at the same distance are shown in Table 1-1. It can be seen that the shielding effectiveness of the laminated shielding inductor made by the above method under different shielding is greater than 20 dB.

TABLE 1-1

| Frequency point | Field intensity (V/m) of example | Field intensity (V/m) of comparative example | Shielding effectiveness/dB |
|---|---|---|---|
| 915 MHz | 11.6 | 1013.4 | 38.8 |
| 1800 MHz | 9.5 | 1108.8 | 41 |
| 2400 MHz | 21.3 | 1183 | 34 |
| 3000 MHz | 51.4 | 1137.1 | 26 |
| 3400 MHz | 77.44 | 1156.43 | 23 |
| 3900 MHz | 102.99 | 1147.17 | 21 |

The background part of the present invention may contain background information about the problem or environment of the present invention, and does not necessarily describe the prior art. Therefore, the content contained in the background art is not the applicant's recognition of the prior art.

The above content is a further detailed description of the present invention in combination with specific/preferred embodiments, and it cannot be considered that the specific implementation of the present invention is only limited to these descriptions. Several substitutions or modifications can be made to the described embodiments by those of ordinary skilled in the technical field of the present invention to which the present invention belongs without departing from the concept of the present invention, and these substitutions or modifications should be regarded as the protection scope of the present invention. In the description of this specification, descriptions with reference to the terms such as "one embodiment", "some embodiments", "preferred embodiments", "examples", "specific examples", or "some examples" mean that specific features, structures, materials or characteristic which are described in conjunction with the embodiments or examples are included in at least one embodiment or example of the present invention. In this specification, the schematic representations of the above terms do not necessarily refer to the same embodiment or example. Moreover, the described specific features, structures, materials or characteristics can be combined in any one or more embodiments or examples in a suitable manner. In the case of no contradiction, the different embodiments or examples and the characteristics of the different embodiments or examples described in this specification can be combined by those skilled in the art. Although the embodiments and advantages of the present invention have been described in detail, it should be understood that various changes, substitutions and alterations can be made herein without departing from the scope of protection of the patent application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A laminated shielding inductor, comprising a laminated body, an internal coil, a first external electrode, a second external electrode, a third external electrode, and a shielding cover, wherein the laminated body comprises a plurality of insulator layers arranged in a laminating manner and is provided with a plurality of layers of coil conductors arranged among the plurality of insulator layers in a laminating manner, conductive through holes are formed in the plurality of insulator layers, the coil conductors of different layers are electrically connected through the conductive through holes to form the internal coil, shielding conductor through grooves which are located at the periphery of the internal coil are formed in the plurality of insulator layers, shielding conductors are arranged in the shielding conductor through grooves, the shielding conductors in the shielding conductor through grooves are electrically connected and jointly form a shielding conductor laminated layer surrounding an outer side of the internal coil, a shielding conductor upper layer and a shielding conductor lower layer are respectively arranged above and below the internal coil, the shielding conductor laminated layer, the shielding conductor upper layer and the shielding conductor lower layer are closed to form the shielding cover enclosing the internal coil, the first external electrode, the second external electrode, and the third external electrode are arranged on a surface of the laminated body, the first external electrode and the second external electrode are electrically connected to the two ends of the internal coil respectively, and the third external electrode is electrically connected to the shielding cover.

2. The laminated shielding inductor of claim 1, wherein the shielding conductor upper layer and the shielding conductor lower layer are located inside the laminated body, insulator layers are respectively arranged at outer sides of the shielding conductor upper layer and the shielding conductor lower layer, the conductive through holes are formed in the plurality of insulator layers so as to electrically connect the shielding conductor upper layer or the shielding conductor lower layer and the third external electrode.

3. The laminated shielding inductor of claim 2, wherein at least a part of each of the first external electrode, the second external electrode, and the third external electrode is located on a same surface of the laminated body, first to third conductive through holes are formed in the insulator layers, fourth to fifth conductive through holes are formed in the shielding cover, the first conductive through hole is electrically connected to the fourth conductive through hole, the second conductive through hole is electrically connected to the fifth conductive through hole, the first external electrode is electrically connected to one end of the internal coil through the first conductive through hole and the fourth conductive through hole, the second external electrode is electrically connected to the other end of the internal coil through the second conductive through hole and the fifth conductive through hole, and the third external electrode is electrically connected to the shielding cover through the third conductive through holes.

4. The laminated shielding inductor of claim 1, wherein at least a part of each of the first external electrode, the second external electrode, and the third external electrode is located on a same surface of the laminated body, and the same surface is a surface perpendicular to a laminated direction of the laminated body, that is, an axial direction of the internal coil.

5. The laminated shielding inductor of claim 4, wherein the laminated body is of a cuboid-shaped structure and has two opposite end faces, two opposite side faces, and opposite upper and lower surfaces, and the same surface is the lower surface of the laminated body.

6. The laminated shielding inductor of claim 5, wherein the shielding conductor laminated layer is of a cuboid-shaped barrel-type structure.

7. The laminated shielding inductor of claim 5, wherein the lower surface of the laminated body is a mounting surface of the laminated shielding inductor.

8. The laminated shielding inductor of claim 1, wherein the conductive through holes connected to the first external electrode and the second external electrode are formed to be perpendicular to the mounting surface where the first external electrode and the second external electrode are located and to be parallel to a first connecting conductor and a second connecting conductor of the axial direction of the internal coil.

9. The laminated shielding inductor of claim 8, wherein the insulation distance between the internal coil and the shielding cover is greater than 30 μm; the insulation distance between the first connecting conductor and the shielding cover and the insulation distance between the second connecting conductor and the shielding cover are greater than 30 μm; and the distance between the shielding cover and the outside of the laminated shielding inductor is greater than 15 μm.

10. The laminated shielding inductor of claim 8, wherein the first connecting conductor and the second connecting conductor respectively pass through the through holes in the shielding conductor lower layer or the shielding conductor upper layer, and are electrically connected to the first external electrode and the second external electrode, the first connecting conductor and the second connecting conductor are insulated from the shielding conductor lower layer or the shielding conductor upper layer by ceramic materials.

* * * * *